Patented Oct. 22, 1935

2,018,028

UNITED STATES PATENT OFFICE 2,018,028

METHOD OF MAKING CELLULOSE ACETATE

George W. Miles, Boston, Mass., assignor to Celanese Corporation of America, a corporation of Delaware No Drawing. Application March 14, 1932, Serial No. 598,879

2 Claims. (Cl. 260—101)

This invention relates to the preparation of organic esters of cellulose and relates more particularly to the production of such cellulose esters having high acyl value but which are soluble in liquids that do not dissolve the organic esters of cellulose of high acyl value previously made, by esterifying cellulose with an esterifying agent that contains little or no solvent for the organic ester of cellulose formed, and then subjecting the same to a novel method of hydrolysis or ripening.

An object of my invention is to prepare organic esters of cellulose of very high acyl content and which are soluble in liquids that are not soluble for prior organic esters of cellulose of high acyl value. A further object of my invention is to ripen or hydrolyze organic esters of cellulose prepared by the so-called "suspension" method in a novel manner whereby desired solubility characteristics may be imparted thereto. Further objects of my invention will appear from the following detailed description.

Heretofore cellulose acetate has been prepared by the treatment of cellulose with an acetylating mixture comprising acetic anhydride, a large amount of acetic acid as solvent for the cellulose acetate that is formed, and a catalyst. The cellulose acetate so formed is not soluble in acetone and in order to impart solubility to the same, the cellulose acetate has been ripened or hydrolyzed. However when solubility in acetone has been developed in the cellulose acetate made by this method, its acetyl value has been reduced to less than 56% (determined as acetic acid). Heretofore it has not been considered possible to prepare an acetone-soluble cellulose acetate having an acetyl value substantially above 56%.

It has been previously proposed to prepare cellulose acetate by the so-called "suspension" method, wherein the cellulose is acetylated with a mixture containing a catalyst, acetic anhydride and such a large amount of diluent that is a non-solvent for the cellulose acetate, that the cellulose acetate that is formed does not dissolve but remains insoluble in the acetylation mixture. However the cellulose acetate so formed is not soluble in acetone, and it has been extremely difficult, if not impossible, to ripen or hydrolyze the same to acetone solubility without great injury to the product.

I have found that if cellulose is esterified by the suspension method by means of an esterifying mixture comprising a suitable catalyst, a non-solvent diluent, and a restricted quantity of aliphatic acid anhydride or halide, there may be formed organic esters of cellulose of high acyl value which have desired solubility characteristics or to which desired solubility characteristics may be imparted by a suitable ripening process.

I have also found that the organic ester of cellulose formed by the suspension method may be hydrolyzed or ripened to desired solubility by conducting the hydrolysis under such conditions that the organic ester of cellulose is in a swollen condition. In the prior attempts to hydrolyze cellulose acetate made by a suspension method, the cellulose acetate was in a solid compact form. I have found that if the hydrolysis is carried out in the presence of a substance that exerts at least a swelling action on the same, the hydrolysis may be carried out to form a cellulose acetate or other organic ester of cellulose which has high acyl value and which is soluble in acetone or other suitable solvent.

In accordance with my invention, I prepare organic esters of cellulose by esterifying cellulose with a restricted quantity of esterifying agent in the presence of a non-solvent diluent and a catalyst to form an organic ester of cellulose of high acyl value. A further aspect of my invention is the ripening or hydrolysis of an organic ester of cellulose in solid state, prepared in any suitable manner, by treatment of the same with a hydrolyzing agent in the presence of a swelling agent for the same.

While this invention is of particular importance in connection with the making of cellulose acetate, other organic esters of cellulose such as cellulose propionate, cellulose butyrate may be made. The cellulose to be esterified may be in any suitable form such as cotton, cotton linters, woven or knitted cotton fabrics, paper or purified wood pulp made by the sulfite, the sulfate or soda process. The cellulosic material may be treated with the esterifying agent directly, or it may be first pretreated with pretreating agents such as acetic anhydride or other fatty acid anhydrides, formic acid, acetic acid or other lower fatty acids, nitric acid, a mixture of nitric acid and acetic anhydride, etc. The pretreating agent may be applied to the cellulose either in the liquid or in the vapor form.

As stated, the cellulosic material is treated with an esterifying agent in concentrated form. This esterifying agent may be the anhydride of the fatty acid radical to be introduced into the cellulose molecule such as acetic anhydride, propionic anhydride or butyric anhydride or the corresponding acyl halide such as acetyl chloride, propionyl chloride, etc. The amount of esterifying agent employed is preferably restricted to substantially the quantity theoretically necessary to attain the desired degree of esterification of the cellulose or an excess no greater than 10% of such theoretical amount.

Preferably I employ during esterification a substantial amount of diluent that is not a solvent for the cellulose ester being formed. In the case of cellulose acetate, examples of such non-solvent diluents are benzol, carbon tetrachloride, isopropyl ether and ethyl ether.

To promote the esterification, any suitable catalyst may be employed such as sulphuric acid, phosphoric acid ($H_3PO_4$), zinc chloride, sodium bisulphate etc. In the preferred form a relatively small amount of catalyst is employed, in the case of sulphuric acid the amount being from less than 0.5 to 10% or more of the weight of the cellulose that is treated. Esterification may be carried out at suitable temperatures from 0° C. through room temperatures up to 60° or more.

The time required for esterification will vary with the temperature of treatment and degree of esterification required. In the case of the preparation of cellulose acetate, at room temperatures (20° C.) the time required may be from 3 to 6 days, at 38° C., the time required may be on the order of 2 days.

In order to hydrolyze the organic ester of cellulose made in accordance with this invention, or any organic ester of cellulose made by any suspension method, or any other organic ester of cellulose while in solid state as opposed to the state of solution, in accordance with this invention the organic ester of cellulose is treated with the hydrolyzing agent in the presence of a swelling agent for the same. Examples of such swelling agents in the case of cellulose acetate are aqueous or other solutions of suitable concentration of acetic acid, sodium thiocyanate, potassium thiocyanate, ammonium thiocyanate, etc. and in some cases acetone.

For hydrolysis there may be employed water, ethyl alcohol (of concentration of say 80 to 100%), glycerine, glycol or a suitable mixture of two or more of these, the quantity employed varying with the specific liquid employed and the specific organic ester of cellulose being treated. In case of cellulose acetate, the amount of water employed may be from 75 to 300% or more of the weight of the cellulose originally employed for acetylation.

To promote hydrolysis, there is preferably present a quantity of mineral acid such as sulphuric acid, hydrochloric acid or phosphoric acid.

The hydrolysis may be conducted at or slightly above room temperatures, and the time required may be from say 18 hours to 4 days or more, depending on the temperature and degree of hydrolysis required.

By my invention there may be prepared cellulose acetates of high acetyl value, having acetyl values of over 58%, which cellulose acetates are soluble in acetone. Indeed, by this invention cellulose acetates may be formed having acetyl values of 63 to 79% (determined as acetic acid) at least some of which are soluble in acetone.

The organic esters formed by this invention may be used for making plastics, films, artificial silk, lacquers, etc. The solid material may be made in the form of a powder in intimate admixture with the plasticizing agent and such powder may be used for molding under heat and pressure.

In order further to illustrate my invention, but without being limited thereto, the following specific examples are given.

*Example I*

100 parts by weight of purified cotton linters or other suitable cellulosic material are pretreated with 150 parts of acetic anhydride for about 24 hours at room temperatures. After this pretreatment, there are added to the mass 85 parts of acetic anhydride, 320 parts of carbon tetrachloride as non-solvent diluent, and 6.1 parts by weight of an aqueous solution of sulphuric acid of 62% concentration as catalyst. The acetylation is allowed to proceed with stirring or agitation for a period of 3 to 6 days at room temperatures. The mass is comminuted and sieved.

If the cellulose acetate prepared in this manner is washed and dried, it is found to have an acetyl value of over 67% (determined as acetic acid), is soluble in methylene chloride and largely but not entirely soluble in acetone.

In order to impart complete acetone solubility to the cellulose acetate formed as above described, the same is hydrolyzed or ripened as follows. To the mass formed after acetylation, there are added 160 parts of water, 150 parts of glacial acetic acid and 48 parts of an aqueous solution of sulphuric acid of 62% concentration. The hydrolysis is allowed to proceed at room temperatures for 24 to 48 hours, and the cellulose acetate is then washed and dried. It has an acetyl value of over 60% (determined as acetic acid) and is soluble in acetone and is insoluble in methylene chloride or in a mixture of methylene chloride and ethyl alcohol.

*Example II*

Cellulose is acetylated in the same manner as described in Example I.

The cellulose acetate so formed is then ripened or hydrolyzed to acetone solubility in the following manner.

To the mass resulting from the acetylation, there are added 100 parts of water, 105 parts of glacial acetic acid and 30 parts of an aqueous solution of sulphuric acid of 62% concentration, and the material is allowed to stand in a closed vessel for 24 hours at room temperatures. Thereupon 60 parts of water and 63 parts of glacial acetic acid are added, and the material maintained at 110° F. (43° C.) for a further period of 36 hours. The cellulose acetate so formed is soluble in acetone and has a high acetyl value.

*Example III*

Cellulose is acetylated in the same manner as described in Example I.

The cellulose acetate so formed is then ripened or hydrolyzed to acetone solubility in the following manner.

To the mass resulting from the acetylation, there are added 440 parts of an aqueous solution of hydrochloric acid of 19% concentration and 240 parts of acetone. After standing for several days, the cellulose acetate is separated, washed and dried and is found to be soluble in acetone.

In the foregoing examples, the proportions of reactants are given by weight.

It is to be understood that the foregoing detailed description is given merely by way of illustration and that many variations may be made therein without departing from the spirit of my invention.

Having described my invention, what I desire to secure by Letters Patent is:

1. Method of producing cellulose acetate of high acetyl value comprising treating cellulose with a restricted quantity of acetylating agent not substantially greater than that required for esterification in the presence of a catalyst and a substantial quantity of diluent that has no solvent action on the cellulose acetate being formed, until a cellulose acetate of acetyl value between 63 and 79% is formed.

2. Method of producing cellulose acetate of high acetyl value comprising treating at substantially room temperatures cellulose with a restricted quantity of acetylating agent not substantially greater than that required for esterification in the presence of a catalyst and a substantial quantity of diluent that has no solvent action on the cellulose acetate being formed, until a cellulose acetate of acetyl value between 63 and 79% is formed.

GEORGE W. MILES.